United States Patent
Wu

(10) Patent No.: US 11,770,603 B2
(45) Date of Patent: Sep. 26, 2023

(54) IMAGE DISPLAY METHOD HAVING VISUAL EFFECT OF INCREASING SIZE OF TARGET IMAGE, MOBILE TERMINAL, AND COMPUTER-READABLE STORAGE MEDIUM

(71) Applicant: GUANGDONG OPPO MOBILE TELECOMMUNICATIONS CORP., LTD., Guangdong (CN)

(72) Inventor: Henggang Wu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/678,002

(22) Filed: Feb. 22, 2022

(65) Prior Publication Data

US 2022/0182554 A1 Jun. 9, 2022

Related U.S. Application Data

(63) Continuation of application No. PCT/CN2020/117823, filed on Sep. 25, 2020.

(30) Foreign Application Priority Data

Oct. 9, 2019 (CN) .......................... 201910953793.1

(51) Int. Cl.
*H04N 23/63* (2023.01)
*G06T 7/13* (2017.01)
*H04N 5/262* (2006.01)

(52) U.S. Cl.
CPC ............ *H04N 23/632* (2023.01); *G06T 7/13* (2017.01); *H04N 5/2628* (2013.01); *H04N 23/633* (2023.01)

(58) Field of Classification Search
CPC .. H04N 23/632; H04N 5/2628; H04N 23/633; H04N 5/2621; H04N 23/62;
(Continued)

(56) References Cited

U.S. PATENT DOCUMENTS

2009/0064049 A1* 3/2009 Pyhalammi ............. G06F 16/54
715/838
2010/0039548 A1* 2/2010 Sakai ............... H04N 5/232935
348/333.12
(Continued)

FOREIGN PATENT DOCUMENTS

CN 101459769 6/2009
CN 103297595 9/2013
(Continued)

OTHER PUBLICATIONS

EPO, European Search Report and Opinion for EP Application No. 20874409.4, dated Sep. 21, 2022.
(Continued)

*Primary Examiner* — Usman A Khan
(74) *Attorney, Agent, or Firm* — Hodgson Russ LLP

(57) ABSTRACT

The present disclosure provides an image display method, a mobile terminal, and a non-transitory computer-readable storage medium. The method includes: acquiring a target image in a preview picture in response to a photographing instruction; and displaying the target image at a present position on a screen of the mobile terminal, and increasing a size of the target image from a first size to a second size during the displaying.

18 Claims, 5 Drawing Sheets

— S101 a target image in a preview picture is acquired in response to a photographing instruction

— S102 the target image is displayed at a present position on a screen of the mobile terminal, and a size of the target image is increased from a first size to a second size during displaying

(58) Field of Classification Search
CPC ....... H04N 5/232935; H04N 5/232939; H04N 5/23216; G06T 7/13; G06T 11/60
USPC .................................................. 348/333.12
See application file for complete search history.

(56) References Cited

U.S. PATENT DOCUMENTS

| | | | | |
|---|---|---|---|---|
| 2012/0120277 | A1* | 5/2012 | Tsai | H04N 23/673 |
| | | | | 348/E9.052 |
| 2014/0071323 | A1* | 3/2014 | Yi | H04N 5/23216 |
| | | | | 348/333.01 |
| 2014/0104210 | A1* | 4/2014 | Kim | G06F 3/0482 |
| | | | | 345/173 |
| 2014/0198234 | A1* | 7/2014 | Kobayashi | H04N 1/00336 |
| | | | | 348/231.99 |
| 2014/0355962 | A1* | 12/2014 | Kim | H04N 1/3871 |
| | | | | 386/282 |
| 2015/0234565 | A1* | 8/2015 | Yang | H04N 1/00 |
| | | | | 715/765 |
| 2015/0256763 | A1* | 9/2015 | Niemi | G06F 3/04845 |
| | | | | 348/700 |
| 2015/0294447 | A1 | 10/2015 | Lee et al. | |
| 2016/0253087 | A1* | 9/2016 | Moon | G06F 3/04883 |
| | | | | 715/720 |
| 2018/0198974 | A1 | 7/2018 | Lee et al. | |
| 2020/0210742 | A1 | 7/2020 | Kim et al. | |

FOREIGN PATENT DOCUMENTS

| | | |
|---|---|---|
| CN | 106354376 | 1/2017 |
| CN | 106937055 | 7/2017 |
| CN | 106980449 | 7/2017 |
| CN | 107343149 | 11/2017 |
| CN | 107864335 | 3/2018 |
| CN | 109361874 | 2/2019 |
| CN | 109948525 | 6/2019 |
| CN | 110083418 | 8/2019 |
| CN | 110677586 | 1/2020 |
| CN | 108604374 | 3/2020 |
| JP | 2007088959 A | 4/2007 |
| JP | 2019164721 | 9/2019 |
| KR | 20130129748 | 11/2013 |
| WO | 2019039760 A1 | 2/2019 |

OTHER PUBLICATIONS

WIPO, International Search Report for PCT/CN2020/117823, dated Dec. 23, 2020.
CNIPA, First Office Action for CN Application No. 201910953793.1, dated Sep. 14, 2020.
CNIPA, Second Office Action for CN Application No. 201910953793.1, dated Jan. 6, 2021.
CNIPA, Notification to Grant Patent Right for Invention for CN Application No. 201910953793.1, dated Jun. 2, 2021.

* cited by examiner

IMAGE DISPLAY METHOD HAVING VISUAL EFFECT OF INCREASING SIZE OF TARGET IMAGE, MOBILE TERMINAL, AND COMPUTER-READABLE STORAGE MEDIUM

CROSS-REFERENCE TO RELATED APPLICATIONS

The present disclosure is a continuation of International Patent Application No. PCT/CN2020/117823, filed Sep. 25, 2020, which claims priority to Chinese Patent Application No. 201910953793.1, filed Oct. 9, 2019, the entire disclosures of which are incorporated herein by reference.

TECHNICAL FIELD

The present disclosure relates to the field of mobile terminal technologies, and in particular, to an image display method, a mobile terminal and a non-transitory computer-readable storage medium.

BACKGROUND

With development of mobile communication technology, more and more functions are integrated in a mobile terminal, such as taking pictures. A user can take pictures or videos using the mobile terminal with a photographing function. For example, in a conference room, it is convenient for the user to to take information on whiteboards, slides or documents at any time by using a mobile phone instead of writing down these information by hand. However, in prior art, after the mobile terminal captures an image, the image will be directly updated at a thumbnail position, and a whole photographing process lacks interest.

SUMMARY

Based on above, the present disclosure provides an image display method, a mobile terminal and a non-transitory computer-readable storage medium.

In a first aspect, the present disclosure provides an image display method for a mobile terminal. The method includes: acquiring a target image in a preview picture in response to a photographing instruction; displaying the target image at a present position on a screen of the mobile terminal, and increasing a size of the target image from a first size to a second size during the displaying.

In a second aspect, the present disclosure provides a mobile terminal. The mobile terminal includes a memory, a processor, and a computer program stored in the memory and configured to be executed by the one processor. The processor is configured to execute the computer program to perform: acquiring a target image in a preview picture in response to a photographing instruction; and displaying the target image at a present position on a screen of the mobile terminal, and increasing a size of the target image from a first size to a second size during the displaying.

In a third aspect, the present disclosure provides a computer-readable storage medium storing a computer program. When the computer program is executed by a processor, the professor is caused to perform: acquiring a target image in a preview picture in response to a photographing instruction; and displaying the target image at a present position on a screen of the mobile terminal, and increasing a size of the target image from a first size to a second size during the displaying.

BRIEF DESCRIPTION OF THE DRAWINGS

In order to make the technical solution described in the embodiments of the present disclosure or prior art more clearly, the drawings used for the description of the embodiments will be briefly described. Apparently, the drawings described below are only for illustration, but not for limitation. One skilled in the art may acquire other drawings based on these drawings, without making any inventive work.

DETAILED DESCRIPTION OF THE PREFERRED EMBODIMENTS

Figure 1:
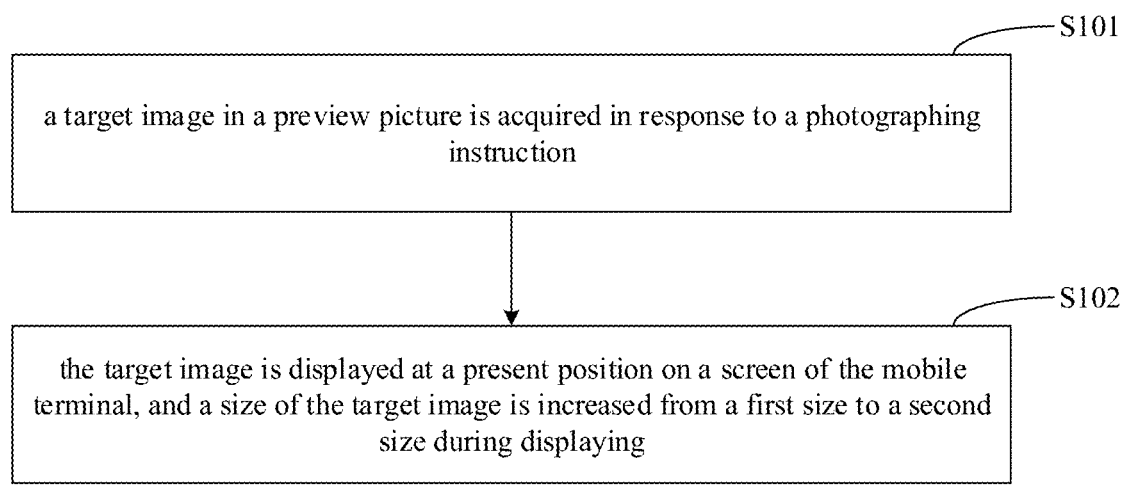
FIG. 1 is a flowchart of an image display method provided by a first embodiment of the present disclosure.

In the following description, for the sake of illustration rather than limitation, specific details such as specific system structures and technologies are proposed in order to thoroughly understand the embodiments of the present disclosure. However, it should be clear to those skilled in the art that the present disclosure can also be implemented in other embodiments without these specific details. In other circumstances, detailed description of well-known systems, devices, circuits and methods is omitted to avoid unnecessary details hindering the description of the present disclosure.

In specific implementation, a mobile terminal described in the embodiments of the present disclosure includes, but is not limited to, a mobile phone, a laptop, a tablet computer, or other portable devices with a touch sensitive surface (e.g., a touch screen display and/or a touch pad). It should also be understood that in some embodiments, the device is not a portable communication device, but a desktop computer with the touch sensitive surface (e.g., the touch screen display and/or the touch pad).

In the following discussion, the mobile terminal with a display and the touch sensitive surface is described. However, it should be understood that the mobile terminal may include one or more other physical user interface devices such as a physical keyboard, a mouse and/or a joystick.

The mobile terminal supports various applications, such as one or more of the following: a drawing application, a presentation application, a word processing application, a website creation application, a disc burning application, a spreadsheet application, a game application, a telephone application, a video conference application, an e-mail application, an instant messaging application, an exercise support application, a photo management application, a digital camera application, a digital video camera application, a web browsing application, a digital music player application, and/or a digital video player application.

Various applications that can be executed on the mobile terminal can use at least one common physical user interface device such as the touch sensitive surface. One or more functions of the touch sensitive surface and corresponding information displayed on the terminal can be adjusted and/or changed between applications and/or within corresponding applications. Under these circumstances, a common physical architecture of the terminal (e.g., the touch sensitive surface) can support various applications with user interfaces that are intuitive and transparent for the user.

It should be understood that the numerical value of the sequence number of each step in the embodiments does not mean the execution sequence, and the execution sequence of each process shall be determined according to functions and internal logic, and shall not limit the implementation process of the embodiments of the present disclosure.

In order to illustrate the technical scheme described in the present disclosure, the following description is based on the specific embodiments of the present disclosure as illustrated.

In some embodiments, an image display method for a mobile terminal is provided by the present disclosure. The image display method includes: acquiring a target image in a preview picture in response to a photographing instruction; displaying the target image at a present position on a screen of the mobile terminal, and increasing a size of the target image from a first size to a second size during the displaying.

Alternatively, after increasing the size of the target image from the first size to the second size, the method further includes: moving the target image from a current position to a thumbnail position, and decreasing the size of the target image from the second size to a thumbnail size during the moving, wherein the current position is a position of the target image in the second size on the screen of the mobile terminal, and the thumbnail size refers to a size of an image displayed at the thumbnail position; and updating an image currently displayed at the thumbnail position to the target image.

Alternatively, before moving the target image from the current position to the thumbnail position, and decreasing the size of the target image from the second size to the thumbnail size during the moving, the method further includes: acquiring a distance between the current position of the target image and the thumbnail position according to the current position of the target image and the thumbnail position; acquiring a moving speed of the target image according to the distance between the current position of the target image and the thumbnail position and a total time for decreasing the size of the target image from the second size to the thumbnail size; acquiring a difference between the second size and the thumbnail size according to the second size and the thumbnail size; acquiring a size decreasing speed of the target image according to the difference between the second size and the thumbnail size and the total time for decreasing the size of the target image from the second size to the thumbnail size. The moving the target image from a current position to a thumbnail position includes: moving the target image from the current position to the thumbnail position according to the moving speed. The decreasing the size of the target image from the second size to a thumbnail size during the moving includes: decreasing the size of the target image from the size of the second size to the thumbnail size according to the size decreasing speed during the moving.

Alternatively, before increasing the size of the target image from the first size to the second size, the method further includes: acquiring a difference between the second size and the first size according to the first size and the second size; acquiring a size increasing speed of the target image according to the difference between the second size and the first size and a total time for increasing the size of the target image from the first size to the second size. The increasing a size of the target image from a first size to a second size includes increasing the size of the target image from the first size to the second size according to the size increasing speed.

Alternatively, the method further includes displaying a text box in the preview picture when a camera in the mobile terminal is started.

Alternatively, the acquiring a target image in a preview picture in response to a photographing instruction includes: changing a color of the text box from a current color to a preset color in response to the photographing instruction; acquiring an image in the text box in the preview picture after the text box displays in the preset color for a preset time, wherein the image in the text box is the target image; and hiding the text box.

Alternatively, the target image refers to an image eliminating a non-target image. The displaying a text box in the preview picture when the camera in the mobile terminal is started includes: acquiring four coordinate points of the text box in the preview picture through an edge detection; and drawing the text box in real time according to the four coordinate points. When lens of the camera in the mobile terminal move, content in the preview picture changes constantly, a result of edge detection changes constantly, and a position of the text box in the preview picture change constantly.

Alternatively, after acquiring the target image in the preview picture, the method further includes correcting tilt of the target image.

Alternatively, the displaying the target image at a present position on a screen of the mobile terminal includes: acquiring a floating layer control; floating and displaying the floating layer control at the present position on the screen of the mobile terminal; and displaying the target image in the floating layer control.

Alternatively, in the displaying, the method further includes increasing a transparency value of the target image from a first transparency value to a second transparency value.

In some embodiments, a mobile terminal is provided by the present disclosure. The mobile terminal includes a memory, a processor and a computer program stored in the memory and run on the processor. When the computer program is executed by the processor, the processor is caused to perform: acquiring a target image in a preview picture in response to a photographing instruction; and displaying the target image at a present position on a screen of the mobile terminal, and increasing a size of the target image from a first size to a second size during the displaying.

Alternatively, when the computer program is executed by the processor, the processor is caused to perform: moving the target image from a current position to a thumbnail position, and decreasing the size of the target image from the second size to a thumbnail size during the moving, wherein the thumbnail size refers to a size of an image displayed at the thumbnail position; updating an image currently displayed at the thumbnail position to the target image.

Alternatively, when the computer program is executed by the processor, the processor is caused to perform: acquiring a distance between the current position of the target image and the thumbnail position according to the current position of the target image and the thumbnail position; acquiring a moving speed of the target image according to the distance between the current position of the target image and the thumbnail position and a total time for decreasing the size of the target image from the second size to the thumbnail size; moving the target image from the current position to the thumbnail position according to the moving speed; acquiring a difference between the second size and the thumbnail size according to the second size and the thumbnail size; acquiring a size decreasing speed of the target image according to the difference between the second size and the thumbnail size and the total time for decreasing the size of the target image from the second size to the thumbnail size; and decreasing the size of the target image from the size of the second size to the thumbnail size according to the size decreasing speed during the moving.

Alternatively, when the computer program is executed by the processor, the processor is caused to perform: acquiring a difference between the second size and the first size according to the first size and the second size; acquiring a size increasing speed of the target image according to the difference between the second size and the first size and a total time for increasing the size of the target image from the first size to the second size; and increasing the size of the target image from the first size to the second size according to the size increasing speed.

Alternatively, when the computer program is executed by the processor, the processor is caused to perform: displaying a text box in the preview picture when a camera in the mobile terminal is started.

Alternatively, during the processor executes the computer program, the acquiring the target image in the preview picture in response to the photographing instruction includes: changing a color of the text box from a current color to a preset color in response to the photographing instruction; acquiring an image in the text box in the preview picture after the text box displays in the preset color for a preset time, wherein the image in the text box is the target image; and hiding the text box.

Alternatively, when the computer program is executed by the processor, the processor is caused to perform correcting tilt of the target image.

Alternatively, when the computer program is executed, the displaying the target image at a present position on a screen of a mobile terminal includes: acquiring a floating layer control; floating and displaying the floating layer control at the present position on the screen of the mobile terminal; and displaying the target image in the floating layer control.

Alternatively, in the displaying, when the computer program is executed by the processor, the processor is caused to perform: increasing a transparency value of the target image from a first transparency value to a second transparency value.

In some embodiments, a non-transitory computer-readable storage medium is provided by the present disclosure. The non-transitory computer-readable storage medium stores a computer program. When the computer program is executed by a processor, the processor is caused to perform: acquiring a target image in a preview picture in response to a photographing instruction; and displaying the target image at a present position on a screen of the mobile terminal, and increasing a size of a target image from a first size to a second size during the displaying.

FIG. 1 is a flowchart of an image display method provided by a first embodiment of the present disclosure. The image display method is for a mobile terminal. As shown in FIG. 1, the image display method can include the following operations.

At block S101, a target image in a preview picture is acquired in response to a photographing instruction.

In some embodiment of the present disclosure, an edge detection function can be added to camera setting of the mobile terminal. If the edge detection function is enabled, the target image in the preview picture can be obtained through edge detection and a non target image in the preview picture can be eliminated in response to the photographing instruction. The non target image refers to an image other than the target image in the preview picture. The target image is usually an image with a specific shape, such as documents, slide handouts or the like in the preview picture. The specific shape is usually quadrilateral. The edge detection function usually refers to a function of acquiring the target image in the preview picture in response to taking pictures. The photographing instruction can be triggered by a user by touching a photographing button on a photographing interface. For example, the photographing instruction is triggered when it is detected that the user touches the photographing button on the photographing interface. The preview picture may be a picture displayed in a preview box of the mobile terminal.

Alternatively, after acquiring the target image in the preview picture, the method further includes: correcting tilt of the target image.

In some embodiments of the present disclosure, the target image may be tilted due to limitation of a shooting angle. After acquiring the target image in the preview picture, it can be first detected whether the target image is tilted. The tilt of the target image can be corrected in response to the target image being tilted, and then subsequent display operations are performed after correction. The subsequent display operations can be directly performed in response to the target image being not tilted.

At block S102, the target image is displayed at a present position on a screen of the mobile terminal, and a size of the target image is increased from a first size to a second size during displaying.

The present position can be any position on the screen of the mobile terminal. Alternatively, in order to facilitate the user to view the target image, the present position can be set to a middle position on the screen of the mobile terminal. In some embodiments, the target image may be floated and displayed at the preset position on the mobile terminal screen.

Alternatively, the floating and displaying of the target image at the present position on the screen of the mobile terminal includes: acquiring a floating layer control; floating and displaying the floating layer control at the present position on the screen of the mobile terminal; and displaying the target image in the floating layer control.

The floating layer control can refer to a floating layer box configured to display the target image. The floating and displaying can refer to displaying above a current preview picture on the screen of the mobile terminal. The target image can be floated and displayed at the preset position of the screen of the mobile terminal by floating and displaying the floating layer control at the preset position of the screen of the mobile terminal.

The second size is a size of the target image during imaging, that is, a size in the preview picture. The first size is less than the second size. The user can set the first size according to actual needs. For example, the first size is 0.72 times of the second size.

In some embodiments of the present disclosure, a size increasing speed of the target image can be acquired according to a difference between the second size and the first size and a total time for increasing the size of the target image from the first size to the second size. The size of the target image can be increased from the first size to the second size according to the size increasing speed. The user can set the total time for increasing the size of the target image from the first size to the second size according to actual needs, such as 0.4 seconds. The difference between the second size and the first size can refer to a value obtained by subtracting the first size from the second size. A value obtained by dividing the difference between the second size and the first size by the total time for increasing the size of the target image from the first size to the second size is the size increasing speed of the target image.

In the embodiment of the present disclosure, in order to increase interest of the mobile terminal in the photographing process, the target image can be presented with a visual effect of increasing the size of the target image in the process of floating and displaying the target image at the present position on the screen of the mobile terminal.

Alternatively, in the displaying, the embodiment of the present disclosure further includes: increasing a transparency value of the target image from a first transparency value to a second transparency value.

In the embodiment of the present disclosure, the transparency value usually ranges from 0 to 1. When the transparency value is 0, the target image is completely transparent. When the transparency value is 1, the target image is completely opaque. By adjusting the transparency value of the target image, the transparency value of the target image can be increased in the process of displaying the target image at the present position on the screen of the mobile terminal. For example, when the first transparency value is 0 and the second transparency value is 1, the display effect of the target image changes from completely transparent to completely opaque. Alternatively, the user can set the first transparency value and the second transparency value according to the actual needs, and the first transparency value is less than the second transparency value.

A increasing speed of the transparency value of the target image can be acquired according to a difference between the second transparency value and the first transparency value and a total time for increasing the transparency value of the target image from the first transparency value to the second transparency value. The transparency value of the target image can be increased from the first transparency value to the second transparency value according to the increasing speed of the transparency value. The difference between the second transparency value and the first transparency value can refer to a value obtained by subtracting the first transparency value from the second transparency value. A value obtained by dividing the difference between the second transparency value and the first transparency value by the total time for increasing the transparency value of the target image from the first transparency value to the second transparency value is the increasing speed of the transparency value of the target image.

It should be noted that since the process of changing the transparency and the process of changing the size are performed simultaneously during presenting of the target image, the total time for increasing the size of the target image from the first size to the second size is the same as the total time for increasing the transparency value of the target image from the first transparency value to the second transparency value.

The embodiment of the present disclosure can increase the interest in the photographing process by increasing the size and the transparency in the displaying of the target image.

Figure 2:
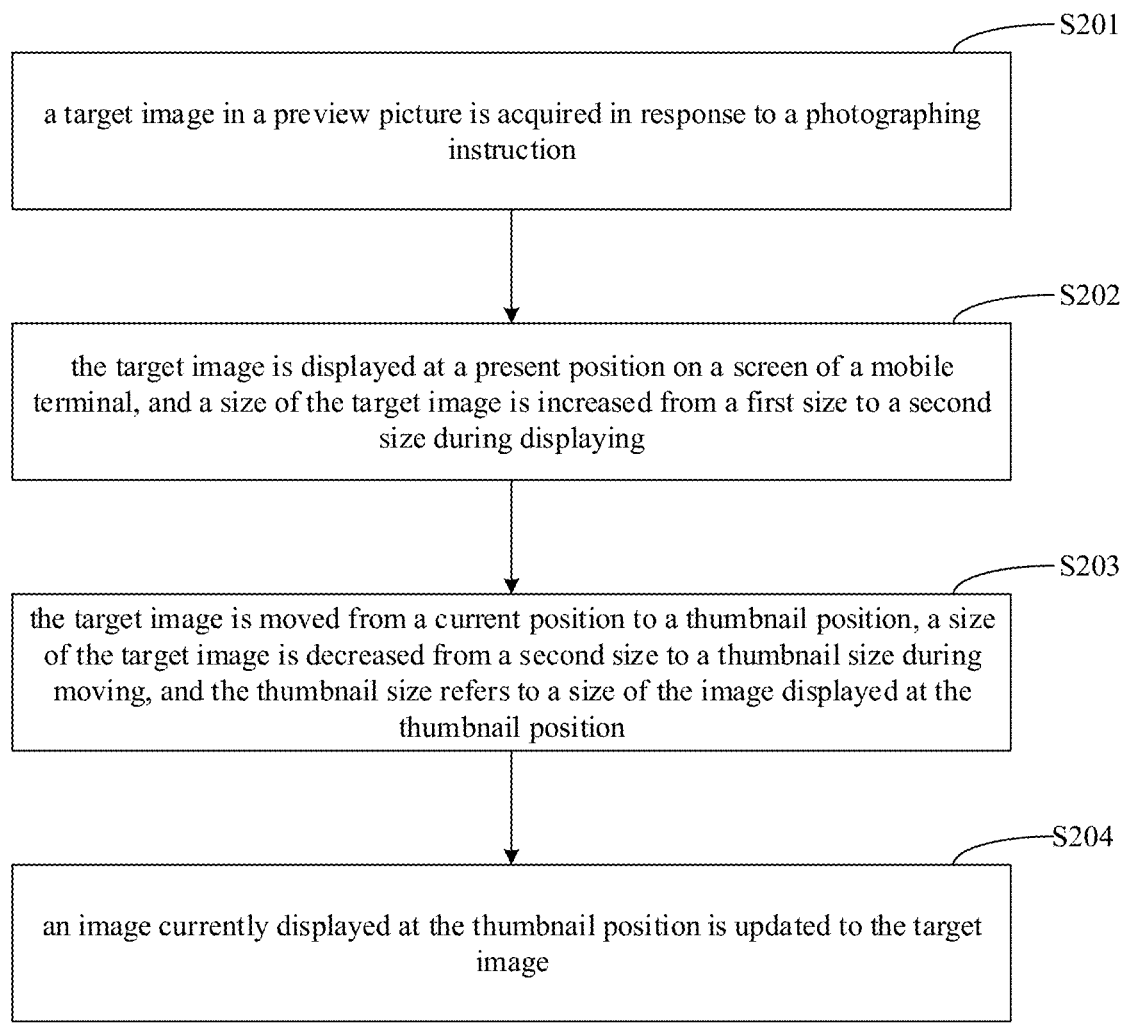
FIG. 2 is a flowchart of an image display method provided by a second embodiment of the present disclosure.

FIG. 2 is a flowchart of an image display method provided by a second embodiment of the present disclosure. The image display method is for the mobile terminal. As shown in FIG. 2, the image display method can include the following operations.

At block S201, a target image in a preview picture is acquired in response to a photographing instruction.

Operations at this block is the same as operations at block S101. For details, relevant description of operations at block S101 can be referred to, which will not be repeated here.

At block S202, the target image is displayed at a present position on a screen of a mobile terminal, and a size of the target image is increased from a first size to a second size during displaying.

Operations at this block is the same as operations block S102. For details, the relevant description of operations at block S102 can be referred to, which will not be repeated here.

At block S203, the target image is moved from a current position to a thumbnail position, a size of the target image is decreased from the second size to a thumbnail size during moving, and the thumbnail size refers to a size of the image displayed at the thumbnail position.

The current position can be a position of the target image currently on the screen of the mobile terminal, that is a position of the target image in the second size on the screen of the mobile terminal. In some embodiments, a geometric center of the position of the target image in the second size coincides with a geometric center of the preset position. The thumbnail position can refer to a position where a thumbnail of a most recently photographed image and is usually located in a lower left corner of the photographing interface. The most recently photographed image can refer to an image whose photographing time is closest to the current time among all images captured by a camera stored in the mobile terminal. The user can enter a display interface of the most recently photographed image by touching the thumbnail currently displayed at the thumbnail position. The thumbnail size is smaller than the second size.

In the embodiment of the present disclosure, a total time for decreasing the size of the target image from the second size to the thumbnail size can be preset. A size decreasing speed of the target image can be acquired according to difference between the second size and the thumbnail size and the total time for decreasing the size of the target image from the second size to the thumbnail size. The size of the target image is decreased from the second size to the thumbnail size according to the size decreasing speed. The user can set the total time for decreasing the size of the target image from the second size to the thumbnail size according to actual needs, for example 0.3 seconds. The difference between the second size and the thumbnail size can refer to a value obtained by subtracting the thumbnail size from the second size. A value obtained by dividing the difference between the second size and the thumbnail size by the total time for decreasing the size of the target image from the second size and the thumbnail size is the size decreasing speed of the size of the target image.

In addition, a distance between the current position of the target image and the thumbnail position can be obtained according to the current position of the target image and the thumbnail position. A moving speed of the target image (that is, a value obtained by dividing the distance between the current position of the target image and the thumbnail position by the total time for decreasing the size of the target image from the second size to the thumbnail size) can be obtained according to the distance between the current position of the target image and the thumbnail position and the total time for decreasing the size of the target image from the second size to the thumbnail size. The target image can be moved from the current position of the target image to the thumbnail position according to the moving speed, so that the target image with the size of thumbnail coincides with the thumbnail, so as to decrease the size of the target image during the moving.

At block S204, an image currently displayed at the thumbnail position is updated to the target image.

In the embodiment of the present disclosure, the image currently displayed at the thumbnail position is updated to the target image after moving the target image from the current position to the thumbnail position, indicating that the target image is an image finally stored in an album of the mobile terminal.

In the embodiment of the present disclosure, by decreasing the size of the target image in the process of moving the target image to the thumbnail position, a visual effect of decreasing the size of the target image in the moving process can be presented, thus further increasing the interest of the photographing process.

Figure 3:
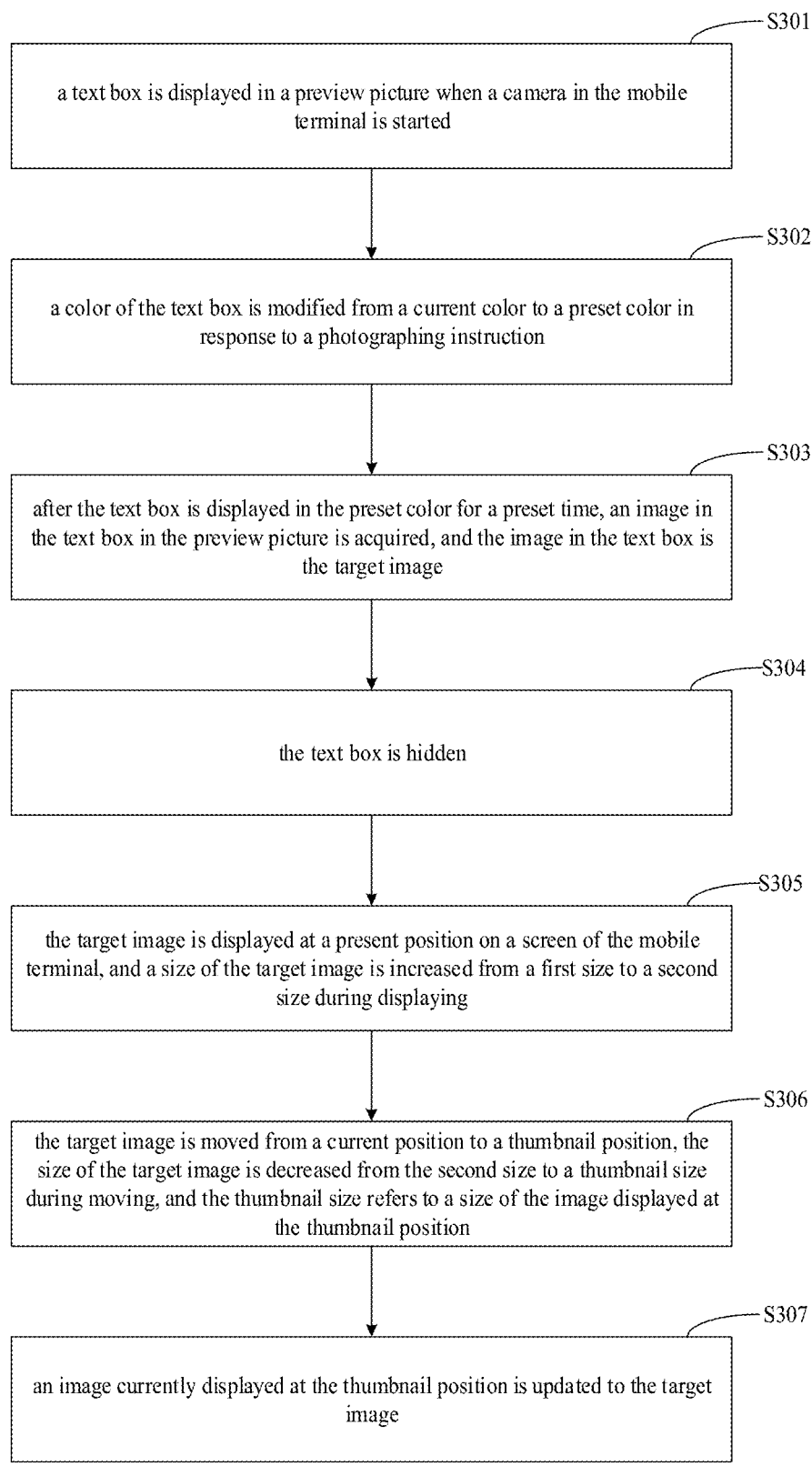
FIG. 3 is a flowchart of an image display method provided by a third embodiment of the present disclosure.

FIG. 3 is a flowchart of an image display method provided by a third embodiment of the present disclosure. The image display method is for the mobile terminal. As shown in FIG. 3, the image display method can include the following operations.

At block S301, a text box is displayed in a preview picture when a camera in the mobile terminal is started.

In the embodiment of the present disclosure, when a start operation of a camera application in the mobile terminal is detected, the camera in the mobile terminal is started, a photographing interface appears, the preview picture in a preview box is displayed on the photographing interface, four coordinate points of the text box in the preview picture are acquired through an edge detection, a corresponding text box can be drawn in real time according to the four coordinate points, and a view can be customized to draw text boxes. When lens of the camera in the mobile terminal move, content in the preview picture changes constantly, a result of edge detection also changes constantly, a position of the text box in the preview picture will also change constantly, and then a real-time following effect of the text box can be realized.

Alternatively, when the preview picture is displayed in the preview box on the photographing interface, if it is detected that the mobile terminal starts the edge detection function, the four coordinate points of the text box in the preview picture can be acquired through edge detection. The corresponding text box can be drawn in real time according to the four coordinate points.

At block S302, a color of the text box is modified from a current color to a preset color in response to a photographing instruction.

At block S303, after the text box is displayed in the preset color for a preset time, an image in the text box in the preview picture is acquired, and the image in the text box is the target image.

In the embodiment of the present disclosure, the edge detection is stopped and the position of the text box is stopped moving in response to the photographing instruction. At this time, the text box can be frozen (that is, the text box is fixed), the color of the text box is changed to the preset color (for example, the color of the text box is changed from yellow to green). After the color of the text box is changed to the preset color, the text box can be frozen for a preset time. After a freeze time reaches the preset time, the image in the text box is acquired and the text box is hidden. In this way, the user's impression can be enhanced and it is facilitated for the user to know the position of the text box. The color of the text box can refer to a color of border of the text box. In the process of changing the color of the text box from the current color to the preset color, the color can be set as gradient to realize a gradient effect of color. The preset color can be a preset color different from the current color of the text box.

It should be noted that the image in the text box in the preview picture can be first acquired in response to the photographing instruction, and then the color of the text box is changed. Or after the color of the text box is changed from the current color to the preset color, the image in the text box in the preview picture is first acquired, and then the text box is hidden after the text box displays in the preset colors for the preset time. There are no limitations here.

At block S304, the text box is hidden.

At block S305, the target image is displayed at a present position on a screen of the mobile terminal, and a size of the target image is increased from a first size to a second size during displaying.

Operations at this block is the same as operations block S102. For details, relevant description of operations at block S102 can be referred to, which will not be repeated here.

At block S306, the target image is moved from a current position to a thumbnail position, the size of the target image is decreased from the second size to a thumbnail size during moving, and the thumbnail size refers to a size of the image displayed at the thumbnail position.

Operations at this block is the same as operations at block S203. For details, relevant description of operations at block S203 can be referred to, which will not be repeated here.

At block S307, an image currently displayed at the thumbnail position is updated to the target image.

Operations at this block is the same as operations at block S204. For details, relevant description of operations at block S204 can be referred to, which will not be repeated here.

In the embodiment of the present disclosure, the target image in the preview picture can be acquired by displaying the text box in the preview picture before the photographing instruction is received, and a color change effect of the text box can be presented by changing the border color of the text box in response to the photographing instruction. The interest of the photographing process is further increased.

Figure 4:
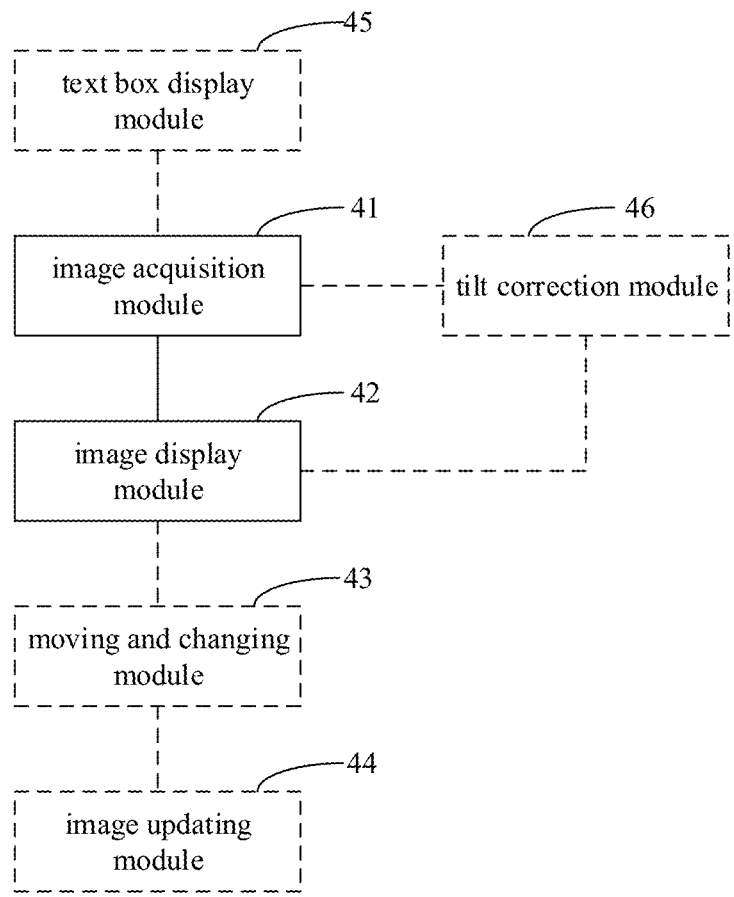
FIG. 4 is a schematic view of an image display apparatus provided by a fourth embodiment of the present disclosure.

FIG. 4 is a schematic view of an image display apparatus provided by a fourth embodiment of the present disclosure. In order to facilitate the illustration of the present disclosure, only parts related to the embodiment of the present disclosure are shown.

The image display apparatus includes an image acquisition module 41 configured to acquire a target image in a preview picture in response to a photographing instruction and an image display module 42 configured to display the target image at a present position on a screen of a mobile terminal, and increase a size of the target image from a first size to a second size during the displaying.

Alternatively, the image display apparatus may further include a moving and changing module 43 configured to move the target image from a current position to a thumbnail position and decreasing a size of the target image from the second size to a thumbnail size during moving, wherein the thumbnail size refers to the size of the image displayed at the thumbnail position, and an image updating module 44 configured to update an image currently displayed at the thumbnail position to the target image.

Alternatively, the image display apparatus may further include a text box display module 45 configured to display a text box in the preview picture when a camera in the mobile terminal is started.

Alternatively, the image acquisition module 41 may include a modification unit configured to change a color of the text box from a current color to a preset color in response to the photographing instruction, a target acquisition unit configured to acquire an image in the text box in the preview picture after the text box displays in the preset color for a preset time, wherein image in the text box is the target image, and a hiding unit configure to hide the text box.

Alternatively, the image display apparatus may further include a tilt correction module 46 configured to correct tilt of the target image.

Alternatively, the image display module 42 may include a control acquisition unit configured to acquire a floating layer control, a first display unit configured to float and display the floating layer control at the present position on the screen of the mobile terminal, and a second display unit configured to display the target image in the floating layer control.

Alternatively, the image display module 42 is further configured to increase a transparency value of the target image from a first transparency value to a second transparency value in the displaying.

The image display apparatus provided by the embodiments of the present disclosure can be applied to the first embodiment, the second embodiment and third embodiment of the above method. For details, the description of the first embodiment, the second embodiment and the third embodiment of the above method can be referred to, which will not be repeated here.

Figure 5:
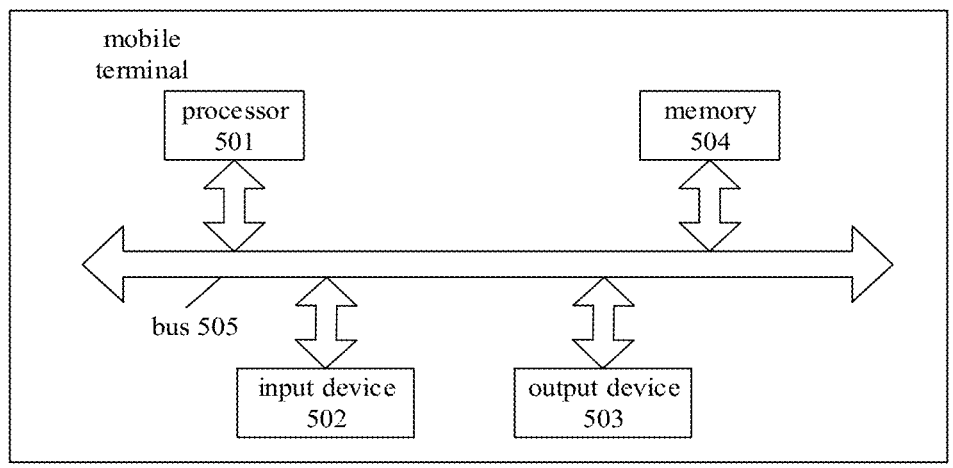
FIG. 5 is a schematic view of a mobile terminal provided by a fifth embodiment of the present disclosure.

FIG. 5 is a schematic view of a mobile terminal provided by fifth embodiment of the present disclosure. As shown in FIG. 5 the mobile terminal may include one or more processors 501 (only one is shown in FIG. 5), one or more input devices 502 (only one is shown in FIG. 5), one or more output devices 503 (only one is shown in FIG. 5), and a memory 504. The processor 501, the input device 502, the output device 503 and the memory 504 are connected through a bus 505. The memory 504 is configured to store instructions, and the processor 501 is configured to execute instructions stored in the memory 504.

The processor 501 is configured to acquire a target image in a preview picture in response to a photographing instruction, display the target image at a present position on a screen of the mobile terminal, and increase a size of the target image from a first size to a second size during displaying.

Alternatively, the processor 501 is further configured to move the target image from a current position to a thumbnail position and decrease a size of the target image from a second size to a thumbnail size during moving, wherein the thumbnail size refers to a size of an image displayed at the thumbnail position, and update an image currently displayed at the thumbnail position to the target image.

Alternatively, the processor 501 is further configured to display a text box in the preview picture when a camera in the mobile terminal is started.

Alternatively, the processor 501 is configured to change a color of the text box from a current color to a preset color in response to the photographing instruction, acquire an image in the text box of the preview picture, wherein image in preview picture is the target image after the text box in the preset color displays for a preset time, and hide the text box.

Alternatively, the processor 501 is further configured to correct tilt of the target image.

Alternatively, the processor 501 is configured to acquire a floating layer control, float and display the floating layer control at the present position on the screen of the mobile terminal, and display the target image in the floating layer control.

Alternatively, the processor 501 is further configured to increase a transparency value of the target image from a first transparency value to a second transparency value.

It should be understood that in the embodiment of the present disclosure, the processor 501 may be a central processing unit (CPU), and the processor may also be other general-purpose processors, digital signal processors (DSP), application specific integrated circuits (ASIC), field-programmable gate array (FPGA) or other programmable logic devices, discrete gate or transistor logic devices, discrete hardware components, or the like. The general-purpose processor may be a microprocessor or may also be any conventional processor or the like.

The input device 502 may include a touch panel, a fingerprint acquisition sensor (configured to collect user's fingerprint information and direction information of the fingerprint), a microphone, a data receiving interface, and the like. The output device 503 may include a LCD, a speaker, a data transmission interface, and the like.

The memory 504 may include a read-only memory and a random access memory, and provide instructions and data to the processor 501. A part of the memory 504 may also include a non-volatile random access memory. For example, the memory 504 may also store information about the device type.

In the specific implementation, the processor 501, the input device 502, the output device 503 and the memory 504 described in the embodiment of the present disclosure can perform the implementation described in the embodiments of the image display method provided by the embodiments of the present disclosure, and the implementation described in the image display apparatus of the fourth embodiment, which will not be repeated here.

Figure 6:
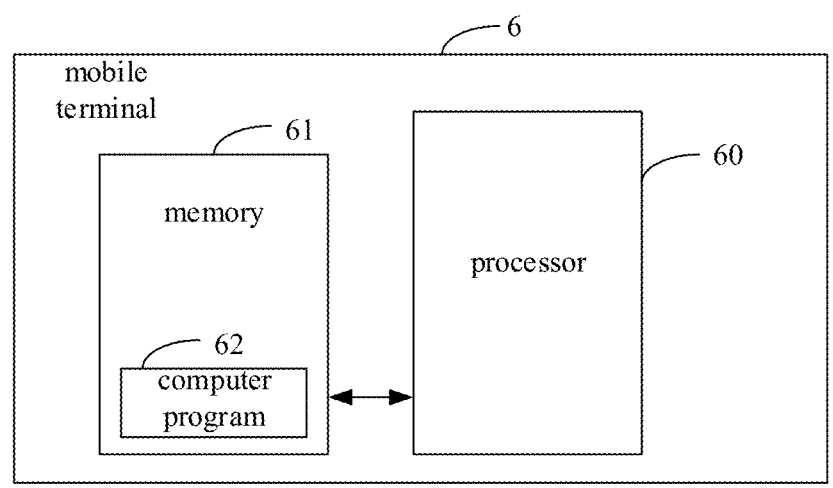
FIG. 6 is a schematic view of a mobile terminal provided by a sixth embodiment of the present disclosure.

FIG. 6 is a schematic view of a mobile terminal provided by a sixth embodiment of the present disclosure. As shown in FIG. 6, the mobile terminal 6 of the embodiment includes a processor 60, a memory 61, and a computer program 62 stored in the memory 61 and run on the processor 60. The processor 60 can realize operations of the image display method in each of the above embodiments when executing the computer program 62. Alternatively, when the processor 60 executes the computer program 62, the processor 60 realizes the functions of each module/unit of the image display apparatus in the above embodiment.

The mobile terminal 6 may be a camera device such as a mobile phone, a tablet computer, a camera, or the like. The mobile terminal may include, but is not limited to, a processor 60 and a memory 61. Those skilled in the art can understand that FIG. 6 is only an example of the mobile terminal 6 and does not constitute a limitation to the mobile terminal 6. The mobile terminal can include more or fewer components than the illustration, or combine some components or different components. For example, the mobile terminal can further include an input and output device, a network access device, a bus, or the like.

The processor 60 may be a central processing unit CPU, and may also be other general-purpose processors, digital signal processors (DSP), application specific integrated circuits (ASIC), field-programmable gate array (FPGA) or other programmable logic devices, discrete gate or transistor logic devices, discrete hardware components, or the like. The general-purpose processor may be a microprocessor or may also be any conventional processor or the like.

The memory 61 may be an internal storage unit of the mobile terminal 6, such as a hard disk or an internal storage of the mobile terminal 6. The memory 61 may also be an external storage device of the mobile terminal 6, such as a plug-in hard disk, a smart media card (SMC), a secure digital (SD) card, a flash card, or the like equipped on the mobile terminal 6. Furthermore, the memory 61 may also include both the internal storage unit of the mobile terminal 6 and the external storage device. The memory 61 is configured to store the computer program and other programs and data required by the mobile terminal. The memory 61 may also be configured to temporarily store data that has been output or to be output.

Those skilled in the art can clearly understand that, for the convenience and simplicity of description, only the functional units and modules divided above are illustrated. In practical application, the above functions can be allocated to different functional units and modules according to needs, that is, the internal structure of the device can be divided into different functional units or modules, to complete all or part of the functions described above. Each functional unit and module in the embodiment can be integrated in one processing unit, or each unit can exist separately physically, or two or more units can be integrated in one unit. The integrated unit can be realized in the form of hardware or software functional unit. In addition, specific names of each functional unit and module are only for mutual distinction and are not used to limit the protection scope of the present disclosure. The specific working process of units and modules in the above system can refer to the corresponding process in the above method embodiments, which will not be repeated here.

In the above embodiments, the description of each embodiment has different emphasis. For the parts not detailed or recorded in one embodiment, the relevant description of other embodiments can be referred to.

Those skilled in the art can realize that the units and algorithm steps of each example described in the embodiments disclosed herein can be implemented in electronic hardware, or a combination of the computer software and the electronic hardware. Whether these functions are performed in hardware or software depends on the specific application and design constraints of the technical scheme. Professional technicians may use different methods to realize the described functions for each specific application, but such implementation should not be considered to be beyond the scope of the present disclosure.

In the embodiment provided by the present disclosure, it should be understood that the disclosed apparatus/mobile terminal and method can be implemented in other ways. For example, the apparatus/mobile terminal described in the above embodiment is only schematic. For example, division of the above units is only a logical function division. In actual implementation, there may be another division method, for example, a plurality of units or components may be combined or integrated into another system, or some features may be ignored or not implemented. On the other hand, mutual coupling or direct coupling or communication connection shown or discussed can be through some interfaces, indirect coupling or communication connection between devices or units can be electrical mechanical or other forms.

Units described as separate units may or may not be physically separated. Components as displayed units may or may not be physical units, that is, the components may be located in one place or distributed to a plurality of network units. Some or all of the units can be selected according to actual needs to achieve the purpose of the embodiments.

In addition, each functional unit in each embodiment of the present disclosure can be integrated in one processing unit, each unit can exist physically alone, or two or more units can be integrated in one unit. The integrated unit can be realized in a form of hardware or software function unit.

The embodiment of the present disclosure also provides a computer-readable storage medium. The computer-readable storage medium stories a computer program. When the computer program is executed by a processor, operations in the above method embodiments can be realized.

The embodiment of the present disclosure provides a computer program product. When the computer program product runs on a mobile terminal, the mobile terminal perform operations in the above method embodiments.

If the integrated unit is realized in the form of software functional unit and sold or used as an independent product, the integrated unit can be stored in a computer-readable storage medium. Based on this understanding, all or part of the processes in the methods of the above embodiments of the present disclosure can also be completed by instructing the relevant hardware through a computer program. The computer program can be stored in the computer-readable storage medium. When the computer program is executed by the processor, operations in the above method embodiments can be realized. The computer program includes computer program code. The computer program code can be in source code form, object code form, executable file, some intermediate form, or the like. The computer-readable medium may include any entity or apparatus capable of carrying the computer program code, a recording medium, a U disk, a mobile hard disk, a magnetic disk, an optical disk, a computer memory, read-only memory (ROM), a random access memory (RAM), an electric carrier signal, a telecommunication signal, a software distribution medium, or the like. It should be noted that the content contained in the computer-readable medium can be appropriately increased or decreased according to the requirements of legislation and patent practice in jurisdictions. For example, in some jurisdictions, according to legislation and patent practice, the computer-readable medium does not include the electric carrier signal and the telecommunication signal.

The above embodiments are only configured to illustrate the technical scheme of the present disclosure, not to limit the technical scheme of the present disclosure. Although the present disclosure has been described in detail with reference to the above embodiments, those skilled in the art should understand that they can still modify the technical solutions recorded in the above embodiments or replace some of the technical features equally. These modifications or substitutions do not drive essence of corresponding technical solutions away from the spirit and scope of the technical solutions of the embodiment of the present disclosure.

What is claimed is:

1. An image display method for a mobile terminal, comprising:
   acquiring, by a processor of the mobile terminal, a target image in a preview picture in response to a photographing instruction;
   displaying, by the processor of the mobile terminal, the target image at a preset position on a screen of the mobile terminal, and increasing, by the processor of the mobile terminal, a size of the target image from a first size to a second size during the displaying;

moving the target image from a current position to a thumbnail position, and decreasing the size of the target image from the second size to a thumbnail size during the moving, wherein the current position is a position of the target image in the second size on the screen of the mobile terminal, and the thumbnail size refers to a size of an image displayed at the thumbnail position; and updating an image currently displayed at the thumbnail position to the target image;

wherein the moving the target image from a current position to a thumbnail position, comprises:
moving the target image from the current position to the thumbnail position according to a moving speed;

wherein the decreasing the size of the target image from the second size to a thumbnail size during the moving, comprises:
decreasing the size of the target image from the size of the second size to the thumbnail size according to a size decreasing speed during the moving.

2. The image display method as claimed in claim 1, wherein before moving the target image from the current position to the thumbnail position, and decreasing the size of the target image from the second size to the thumbnail size during the moving, the method further comprises:
acquiring a distance between the current position of the target image and the thumbnail position according to the current position of the target image and the thumbnail position;
acquiring the moving speed of the target image according to the distance between the current position of the target image and the thumbnail position and a total time for decreasing the size of the target image from the second size to the thumbnail size;
acquiring a difference between the second size and the thumbnail size according to the second size and the thumbnail size;
acquiring the size decreasing speed of the target image according to the difference between the second size and the thumbnail size and the total time for decreasing the size of the target image from the second size to the thumbnail size.

3. The image display method as claimed in claim 1, wherein before increasing the size of the target image from the first size to the second size, the method further comprises:
acquiring a difference between the second size and the first size according to the first size and the second size;
acquiring a size increasing speed of the target image according to the difference between the second size and the first size and a total time for increasing the size of the target image from the first size to the second size;
wherein the increasing a size of the target image from a first size to a second size, comprises:
increasing the size of the target image from the first size to the second size according to the size increasing speed.

4. The image display method as claimed in claim 1, further comprising:
displaying a text box in the preview picture when a camera in the mobile terminal is started.

5. The image display method as claimed in claim 4, wherein the acquiring a target image in a preview picture in response to a photographing instruction, comprises:

changing a color of the text box from a current color to a preset color in response to the photographing instruction;
acquiring an image in the text box in the preview picture after the text box displays in the preset color for a preset time, wherein the image in the text box is the target image; and
hiding the text box.

6. The image display method as claimed in claim 5, wherein the displaying a text box in the preview picture when the camera in the mobile terminal is started, comprises:
acquiring four coordinate points of the text box in the preview picture through an edge detection; and
drawing the text box in real time according to the four coordinate points, wherein when lens of the camera in the mobile terminal move, content in the preview picture changes constantly, a result of edge detection changes constantly, and a position of the text box in the preview picture change constantly.

7. The image display method as claimed in claim 1, wherein after acquiring the target image in the preview picture, the method further comprises:
correcting tilt of the target image.

8. The image display method as claimed in claim 1, wherein the displaying the target image at a preset position on a screen of the mobile terminal, comprises:
acquiring a floating layer control;
floating and displaying the floating layer control at the preset position on the screen of the mobile terminal;
displaying the target image in the floating layer control.

9. The image display method as claimed in claim 1, wherein in the displaying, the method further comprises:
increasing a transparency value of the target image from a first transparency value to a second transparency value.

10. A mobile terminal, comprising a memory, a processor and a computer program stored in the memory and run on the processor, wherein when the computer program is executed by the processor, the processor is caused to perform:
acquiring a target image in a preview picture in response to a photographing instruction;
displaying the target image at a preset position on a screen of the mobile terminal, and increasing a size of the target image from a first size to a second size during the displaying;
moving the target image from a current position to a thumbnail position, and decreasing the size of the target image from the second size to a thumbnail size during the moving, wherein the thumbnail size refers to a size of an image displayed at the thumbnail position; and
updating an image currently displayed at the thumbnail position to the target image;
wherein the moving the target image from a current position to a thumbnail position, comprises:
moving the target image from the current position to the thumbnail position according to the moving speed;
wherein the decreasing the size of the target image from the second size to a thumbnail size during the moving, comprises:
decreasing the size of the target image from the size of the second size to the thumbnail size according to the size decreasing speed during the moving.

11. The mobile terminal as claimed in claim 10, wherein when the computer program is executed by the processor, the processor is caused to perform:

acquiring a distance between the current position of the target image and the thumbnail position according to the current position of the target image and the thumbnail position;

acquiring the moving speed of the target image according to the distance between the current position of the target image and the thumbnail position and a total time for decreasing the size of the target image from the second size to the thumbnail size;

acquiring a difference between the second size and the thumbnail size according to the second size and the thumbnail size; and acquiring the size decreasing speed of the target image according to the difference between the second size and the thumbnail size and the total time for decreasing the size of the target image from the second size to the thumbnail size.

12. The mobile terminal as claimed in claim 10, wherein when the computer program is executed by the processor, the processor is caused to perform:

acquiring a difference between the second size and the first size according to the first size and the second size;

acquiring a size increasing speed of the target image according to the difference between the second size and the first size and a total time for increasing the size of the target image from the first size to the second size;

increasing the size of the target image from the first size to the second size according to the size increasing speed.

13. The mobile terminal as claimed in claim 10, wherein when the computer program is executed by the processor, the processor is caused to perform:

displaying a text box in the preview picture when a camera in the mobile terminal is started.

14. The mobile terminal as claimed in claim 13, wherein during the processor executes the computer program, the acquiring the target image in the preview picture in response to the photographing instruction, comprises:

changing a color of the text box from a current color to a preset color in response to the photographing instruction;

acquiring an image in the text box in the preview picture after the text box displays in the preset color for a preset time, wherein the image in the text box is the target image; and hiding the text box.

15. The mobile terminal as claimed in claim 10, wherein when the computer program is executed by the processor, the processor is caused to perform:

correcting tilt of the target image.

16. The mobile terminal as claimed in claim 10, wherein when the computer program is executed by the processor, the displaying the target image at a preset position on a screen of a mobile terminal, comprises:

acquiring a floating layer control;

floating and displaying the floating layer control at the preset position on the screen of the mobile terminal;

displaying the target image in the floating layer control.

17. The mobile terminal as claimed in claim 10, wherein in the displaying, when the computer program is executed by the processor, the processor is caused to perform:

increasing a transparency value of the target image from a first transparency value to a second transparency value.

18. A non-transitory computer-readable storage medium storing a computer program, wherein when the computer program is executed by a processor of a mobile terminal, the processor is caused to perform:

acquiring a target image in a preview picture in response to a photographing instruction;

displaying the target image at a preset position on a screen of a mobile terminal, and increasing a size of the target image from a first size to a second size during the displaying;

moving the target image from a current position to a thumbnail position, and decreasing the size of the target image from the second size to a thumbnail size during the moving, wherein the thumbnail size refers to a size of an image displayed at the thumbnail position; and updating an image currently displayed at the thumbnail position to the target image;

wherein the moving the target image from a current position to a thumbnail position, comprises:

moving the target image from the current position to the thumbnail position according to the moving speed;

wherein the decreasing the size of the target image from the second size to a thumbnail size during the moving, comprises:

decreasing the size of the target image from the size of the second size to the thumbnail size according to the size decreasing speed during the moving.

* * * * *